(12) United States Patent
Shimura et al.

(10) Patent No.: US 9,653,762 B2
(45) Date of Patent: May 16, 2017

(54) BATTERY TEMPERATURE REGULATION SYSTEM AND BATTERY TEMPERATURE REGULATION UNIT

(75) Inventors: Takahiro Shimura, Tokyo (JP); Chikako Satake, Tokyo (JP); Masami Ikeda, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 589 days.

(21) Appl. No.: 13/816,706

(22) PCT Filed: Jul. 4, 2011

(86) PCT No.: PCT/JP2011/065253
§ 371 (c)(1),
(2), (4) Date: Apr. 29, 2013

(87) PCT Pub. No.: WO2012/020614
PCT Pub. Date: Feb. 16, 2012

(65) Prior Publication Data
US 2013/0216888 A1    Aug. 22, 2013

(30) Foreign Application Priority Data
Aug. 12, 2010    (JP) .................. 2010-181080

(51) Int. Cl.
*H01M 10/50*    (2006.01)
*H01M 10/61*    (2014.01)
(Continued)

(52) U.S. Cl.
CPC ..... *H01M 10/5002* (2013.01); *H01M 2/1077* (2013.01); *H01M 10/61* (2015.04);
(Continued)

(58) Field of Classification Search
CPC ........... H01M 10/5002; H01M 10/613; H01M 10/6552; H01M 2/1077; H01M 10/615
See application file for complete search history.

(56) References Cited

U.S. PATENT DOCUMENTS 3,988,170 A * 10/1976 Koch et al. ............. 429/163
6,692,864 B1   2/2004 Dansui et al.
(Continued)

FOREIGN PATENT DOCUMENTS

CN          1540796 A      10/2004
CN        101378141 A       3/2009
(Continued)

OTHER PUBLICATIONS

Japan Patent Application No. 2011-553991; Office Action; dated Mar. 27, 2012; 4 pages.
(Continued)

*Primary Examiner* — Mark F Huff
*Assistant Examiner* — Monique Wills
(74) *Attorney, Agent, or Firm* — Baker & Hostetler LLP

(57) ABSTRACT

Provided are a battery temperature regulation system capable of efficiently heating and/or cooling a battery, and a battery temperature regulation unit suitable for use in the battery temperature regulation system. The battery temperature regulation system 10 is provided with a thermally conductive member (e.g., a heat pipe 11) thermally connected to a battery 1, a heating device (e.g., a heater 12) that heats the battery 1 via the thermally conductive member and/or a cooling device (e.g., an air conditioning apparatus) that cools the battery 1 via the thermally conductive member.

19 Claims, 13 Drawing Sheets

(51) Int. Cl.
    *H01M 2/10* (2006.01)
    *H01M 10/625* (2014.01)
    *H01M 10/6551* (2014.01)
    *H01M 10/6552* (2014.01)
    *H01M 10/615* (2014.01)
    *H01M 10/613* (2014.01)

(52) U.S. Cl.
    CPC ..... *H01M 10/625* (2015.04); *H01M 10/6551* (2015.04); *H01M 10/6552* (2015.04); *H01M 10/613* (2015.04); *H01M 10/615* (2015.04)

(56) References Cited

U.S. PATENT DOCUMENTS

| | | | | |
|---|---|---|---|---|
| 2002/0177035 | A1* | 11/2002 | Oweis | H01M 10/613 429/120 |
| 2006/0210868 | A1 | 9/2006 | Kim et al. | |
| 2008/0057382 | A1* | 3/2008 | Kimura | H01M 2/1016 429/120 |
| 2009/0142654 | A1* | 6/2009 | Fakers et al. | 429/120 |

FOREIGN PATENT DOCUMENTS

| | | |
|---|---|---|
| CN | 101499545 A | 8/2009 |
| CN | 101527352 A | 9/2009 |
| JP | H10-032021 | 2/1998 |
| JP | 11-354166 A | 12/1999 |
| JP | 3050051 | 6/2000 |
| JP | 2003-197278 | 7/2003 |
| JP | 3733682 | 1/2006 |
| JP | 2006-269426 | 10/2006 |
| JP | 2007-213939 | 8/2007 |
| JP | 2008-047371 | 2/2008 |
| JP | 2009-004237 A | 1/2009 |

OTHER PUBLICATIONS

Japan Patent Application No. 2011-553991; Decision to Grant; dated Aug. 15, 2013; 4 pages.
China Patent Application No. 201180038438.3; Office Action; dated Dec. 3, 2014; 18 pages.
International Patent Application No. PCT/JP2011/065253; International Search Report dated Dec. 6, 2011, 2 pages.
China Patent Application No. 201180038438.3; Office Action; dated Jul. 8, 2015; 9 pages.

* cited by examiner

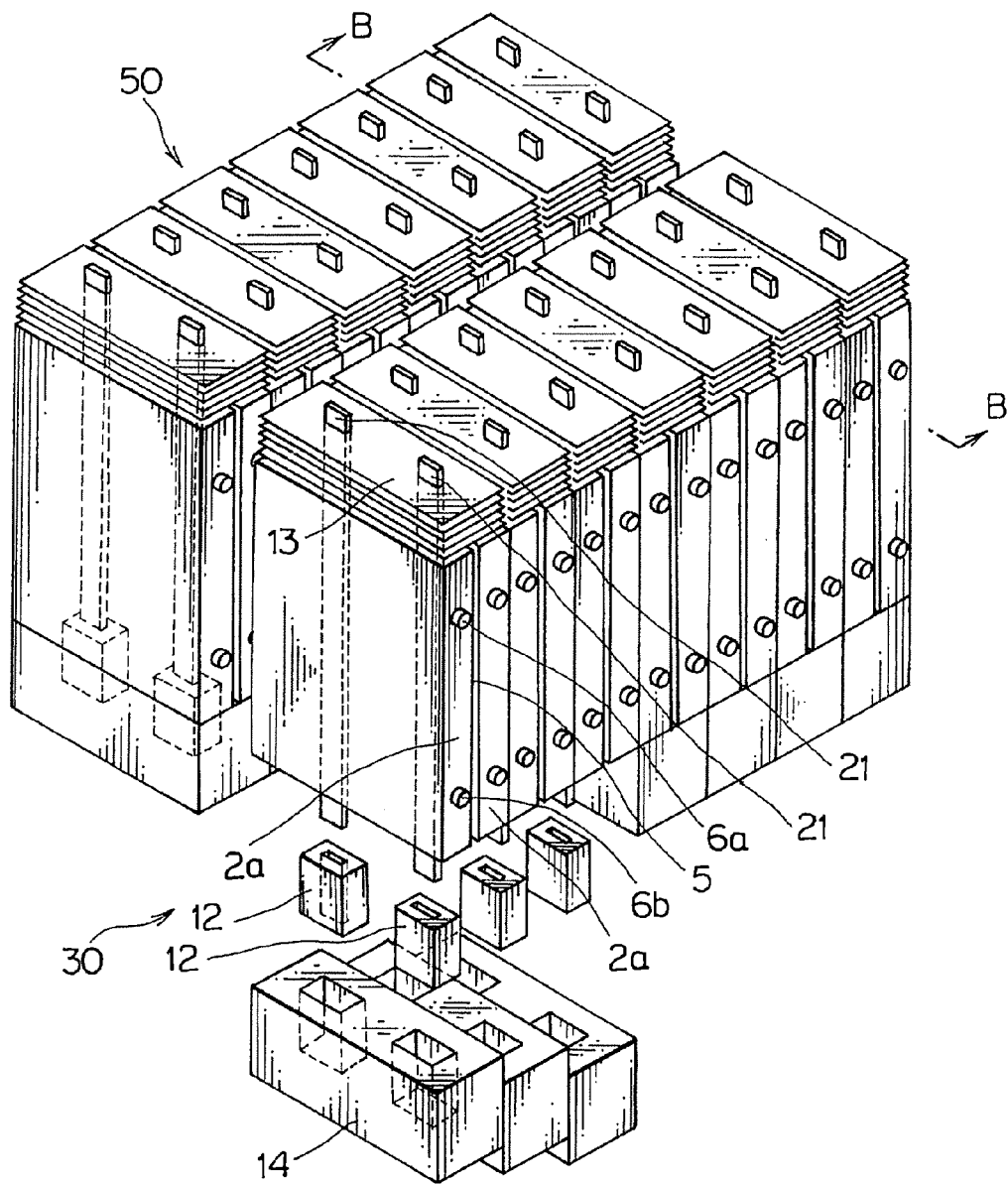
F I G. 4

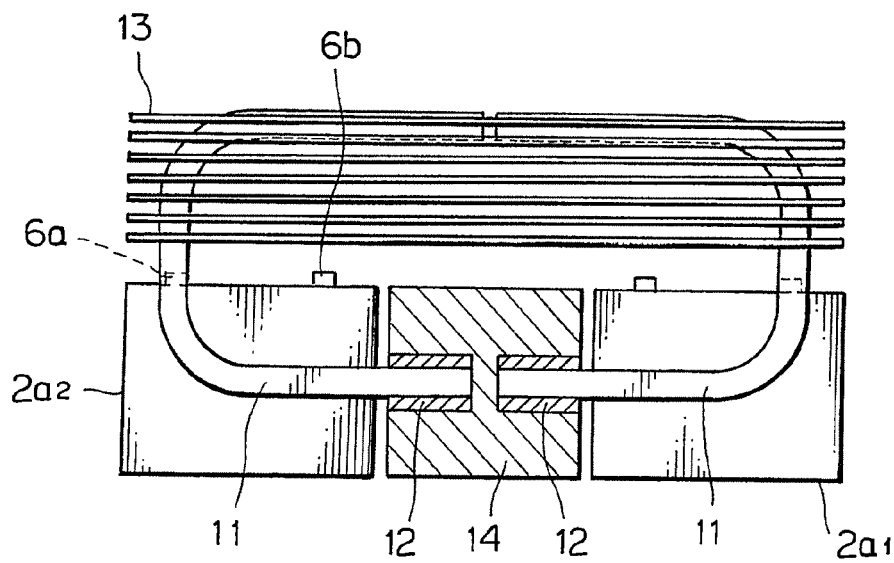
F I G. 15
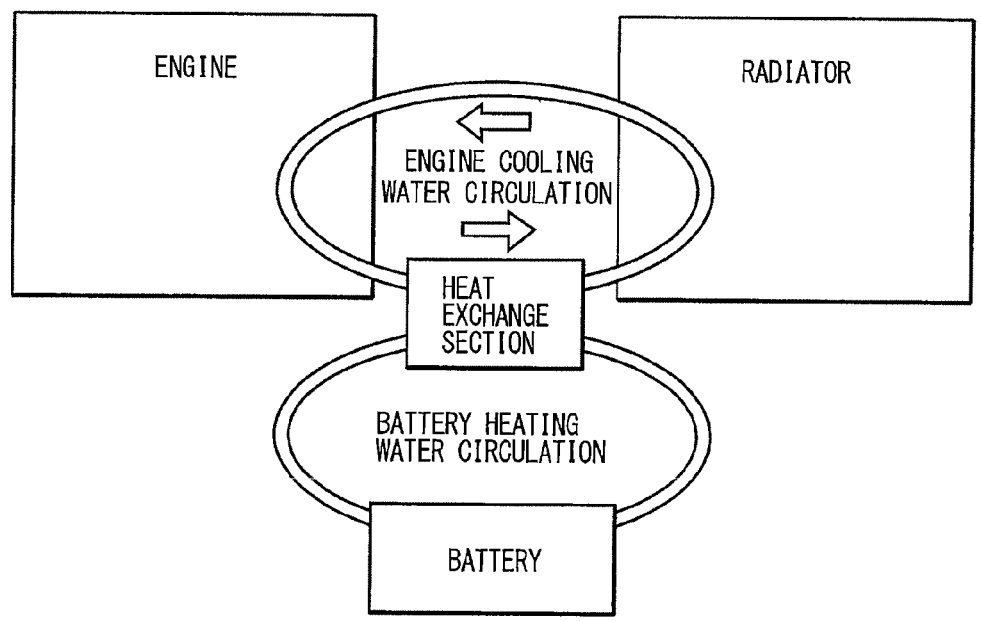
F I G. 16

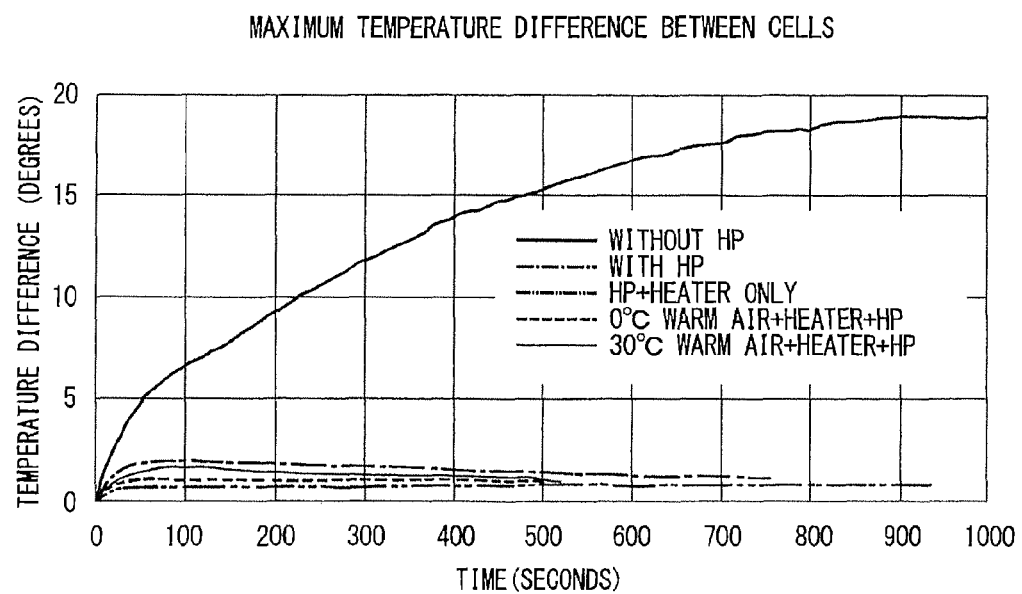
F I G. 1 7
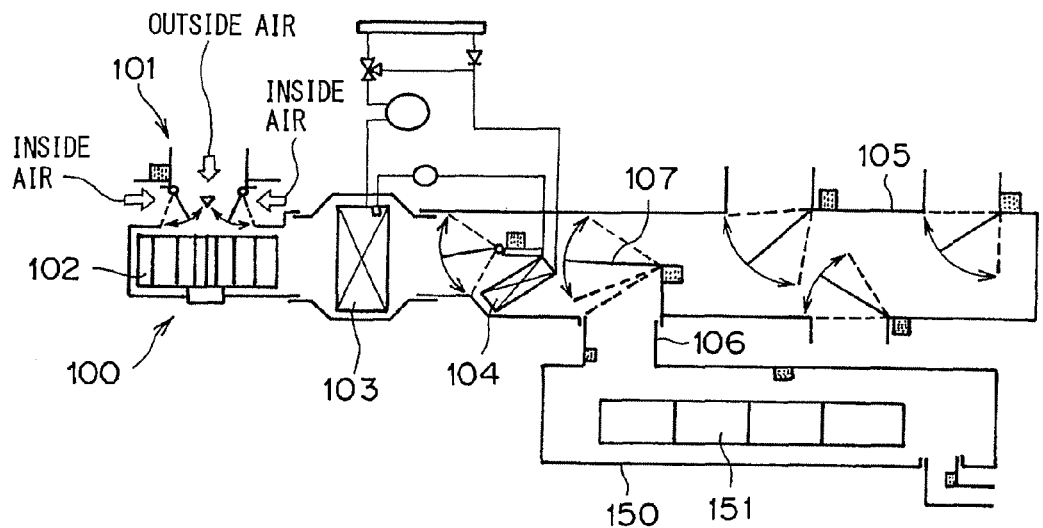
F I G. 1 8

BATTERY TEMPERATURE REGULATION SYSTEM AND BATTERY TEMPERATURE REGULATION UNIT

CROSS-REFERENCE TO RELATED APPLICATIONS

This application is the National Stage of International Application No. PCT/JP2011/65253, filed Jul. 4, 2011, which claims the benefit of Japanese Patent Application No. 2010-181080, filed Aug. 12, 2010, the disclosure of which is incorporated herein by reference in its entirety.

TECHNICAL FIELD

The present invention relates to a battery temperature regulation system and a battery temperature regulation unit.

BACKGROUND ART

Hybrid vehicles and electric vehicles, which are recently under further development, are equipped with secondary batteries (batteries) such as nickel-hydride batteries and lithium-ion batteries.

Such batteries have optimum usage temperature ranges and it is known that battery power decreases under a low-temperature condition of, for example, 0° C. or below.

In order to deal with such a problem, Patent Document 1 discloses an air conditioning apparatus 100 for electric vehicles (see FIG. 18) capable of cooling or heating a battery 151 in a battery frame 150 utilizing air for car cabin air-conditioning, in which the air conditioning apparatus 100 includes an air box 101, a blower fan 102 serving as an air blower, a cooling unit 103 capable of cooling air from the blower fan 102, a sub-condenser 104 capable of heating air which has passed through the cooling unit 103, and an indoor duct 105 that introduces air which has passed through the sub-condenser 104 into the car cabin, wherein a battery duct 106 branches from the indoor duct 105 to guide air to the battery frame 150, and wherein a battery door 107 is provided at a location where the indoor duct 105 and the battery duct 106 branch, the battery door 107 being capable of switching air, which has passed through the sub-condenser 104, to an indoor duct 105-side or to a battery duct 106-side, and being capable of adjusting an opening of the switching.

Patent Document 2 discloses an electric vehicle-mounted battery temperature regulation apparatus that is configured to cool or warm a vehicle propulsion battery accommodated in a battery case by introducing air used for car cabin air-conditioning into the battery case via an introducing channel. Patent Document 3 discloses covering a battery with a heat insulating material and, in addition, using a heating device such as an electric heater, in order to prevent the temperature of the battery from decreasing in a cold climate or in a cold region. Further, Patent Document 4 discloses a secondary battery module including a plurality of unit batteries, a partition disposed between the unit batteries adjacent to each other, a housing in which the unit batteries and the partition are installed and provided with an inlet and an outlet through which a heat transfer medium flows, and a PTC heater provided between the partition and the unit battery.

DOCUMENT LIST

Patent Document(s)
Patent Document 1: Japanese Patent No. 3050051
Patent Document 2: Japanese Patent No. 3733682
Patent Document 3: Japanese Laid-Open Patent Application (Kokai) No. 10-32021
Patent Document 4: Japanese Laid-Open Patent Application (Kokai) No. 2006-269426

SUMMARY OF INVENTION

Technical Problem

In the cases of Patent Documents 1 and 2 where the temperature is regulated by causing air to flow to the batteries, since the air serving as the heat transfer medium also heats or cools peripheral members such as accommodating members for the batteries, there is a problem that a part of heat will be lost and a heating efficiency of the battery lower will decrease.

Further, when air is blown towards the battery, since there will be a difference in the air temperature between an upstream side and a downstream side and also a temperature difference inside the battery, a load will concentrate on a part of the cells constituting the battery and a failure may occur in the relevant cell.

Also, as in the cases of Patent Documents 3 and 4 where the batteries are heated with a heater, there is also a problem that a temperature difference may occur between a portion proximate to a portion in contact with the heater and a portion distal to the portion in contact with the heater.

Accordingly, an object of the invention is to provide a battery temperature regulation system and a battery temperature regulation unit capable of heating and/or cooling the battery in an efficient manner.

Solution to Problem

In order to achieve the above object, a system for regulating a temperature of a battery according to a first aspect of the invention includes a thermally conductive member that is thermally connected to the battery and a heating device that heats the battery via the thermally conductive member and/or a cooling device that cools the battery via the thermally conductive member.

A second aspect of the invention is a battery temperature regulation system in which the battery is provided with a plurality of battery cells arranged in an aligned manner, the thermally conductive member being disposed between the neighboring battery cells, the battery temperature regulation system including a fin that is thermally connected to the thermally conductive member, and a warm air supplying device that delivers warm air to the fin, the warm air supplying device serving as the heating device.

A third aspect of the invention is a battery temperature regulation system further including, as the heating device, a heating device that is different from the warm air supplying device.

A fourth aspect of the invention is a battery temperature regulation system further including a thermal diffusion suppressing device that suppresses heat release from the fin while being heated by the heating device that is different from the warm air supplying device.

A fifth aspect of the invention is a battery temperature regulation system in which the battery is provided with a plurality of battery elements, each of the plurality of battery elements including a single battery cell or a plurality of battery cells arranged in an aligned manner, the thermally conductive member being disposed between the neighboring battery elements with both end portions being protruded from between the battery elements, a fin being thermally connected to one end portion of the thermally conductive member, the heating device being a warm air supplying device that deliver warm air to the fin and a heater that is thermally connected to the other end portion of the thermally conductive member.

A sixth aspect of the invention is a battery temperature regulation system in which the thermally conductive member is a heat pipe.

A seventh aspect of the invention is a battery temperature regulation system in which the thermally conductive member is a metal and/or graphite.

An eighth aspect of the invention is a battery temperature regulation system in which the heating device is at least one selected from an engine exhaust air supplying device, an air conditioning apparatus, a warm water supplying device and a heater, and the cooling device is at least one selected from an air conditioning apparatus, a thermoelectric element and a cooling air supply device.

A ninth aspect of the invention is a battery temperature regulation unit used in temperature regulation of a battery provided with a plurality of battery elements, each of the plurality of battery elements including a single battery cell or a plurality of battery cells arranged in an aligned manner, the battery temperature regulation unit including a heat pipe securing portion whereto a heat pipe is secured with at least one portion being protruded, a battery element securing portion provided at least on one side of the heat pipe securing portion and securing a battery cell that constitutes one of the neighboring battery elements, the heat pipe being thermally connectable to the battery cell when the battery cell is secured to the battery element securing portion.

A tenth aspect of the invention is a battery temperature regulation unit including a pair of battery element securing portions, the battery securing portions being provided on both sides of the heat pipe securing portion to sandwich the heat pipe securing portion, each of the battery element securing portions securing a battery cell that constitutes one of the neighboring battery elements.

An eleventh aspect of the invention is a battery temperature regulation unit in which the heat pipe is secured to the heat pipe securing portion with at least two portions thereof being protruded, a fin being thermally connected to one portion of the heat pipe, a heater being thermally connected to another portion of the heat pipe.

A twelfth aspect of the invention is a battery temperature regulation unit in which the battery cell is one of a rectangular column-shaped battery cell, a laminated battery cell and a cylindrical battery cell.

Advantageous Effects of Invention

According to an input display apparatus of the present invention, a battery can be efficiently heated and/or cooled since a battery temperature regulation system for regulating a temperature of a battery includes a thermally conductive member that is thermally connected to the battery, and a heating device that heats the battery via the thermally conductive member and/or a cooling device that cools the batter via the thermally conductive member.

BRIEF DESCRIPTION OF DRAWINGS

FIG. 4 is a perspective view illustrating a battery temperature regulation system of a second embodiment.

FIG. 15 is a cross-sectional view showing a modified example of a shape of the heat pipe.

FIG. 16 is a schematic structural diagram illustrating a battery temperature regulation system.

FIG. 17 is a plot showing data obtained by measuring a temperature variation between the cells in the simulation of the embodiments.

FIG. 18 is a schematic diagram illustrating a battery temperature regulation apparatus of the related art.

DESCRIPTION OF THE PREFERRED EMBODIMENTS

Hereinafter, the present invention will be described in detail with reference to the embodiments.

Embodiment 1

Figure 1:
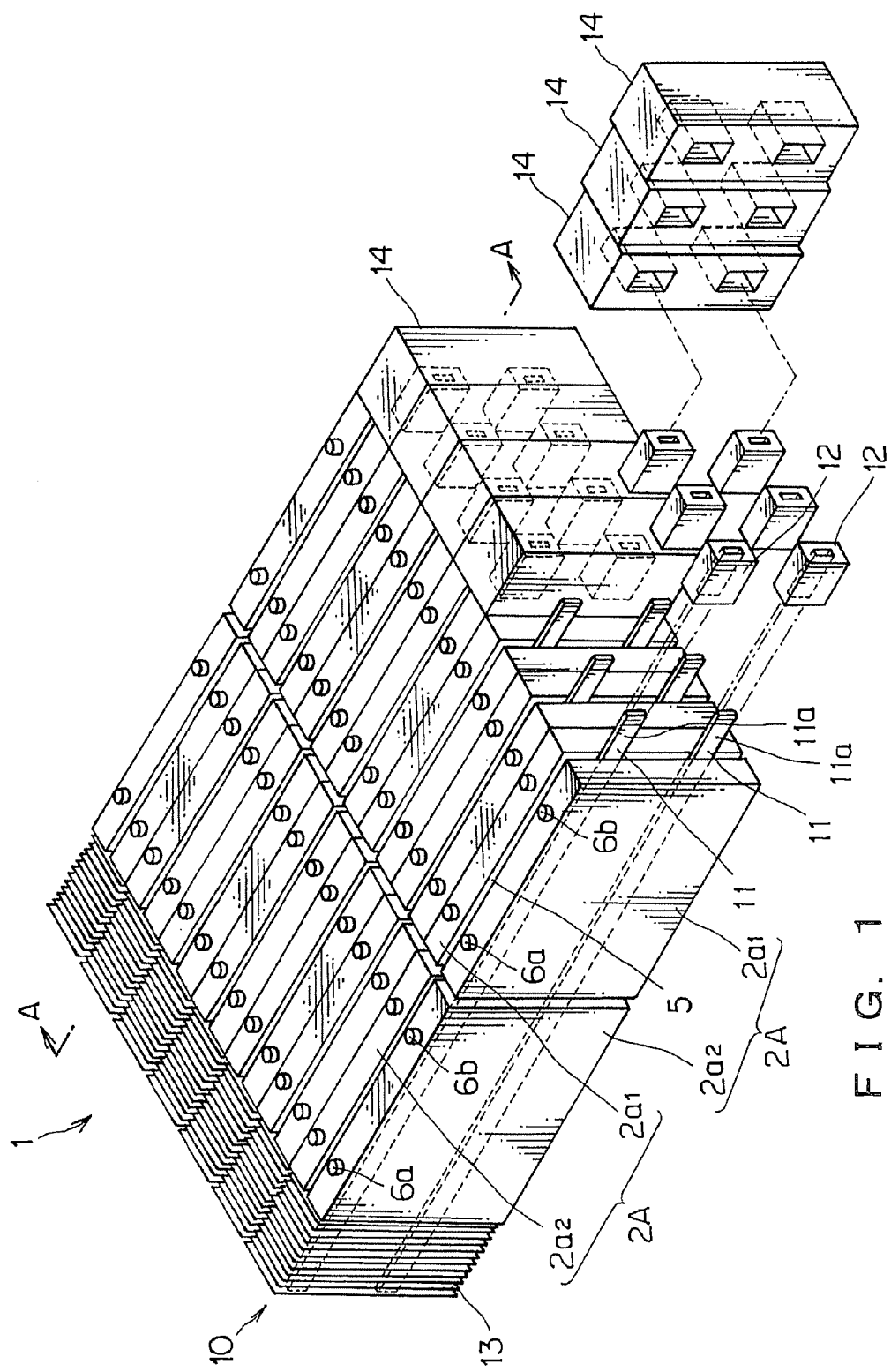
FIG. 1 is a perspective view illustrating a battery temperature regulation system of a first embodiment.
Figure 2:
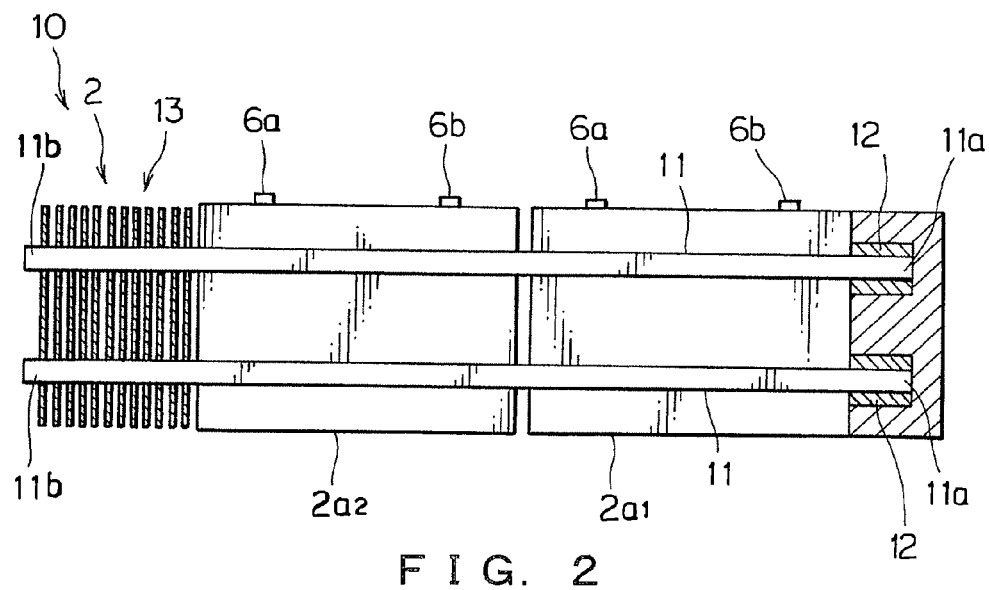
FIG. 2 is a cross-sectional view taken along A-A of FIG. 1.
Figure 3:
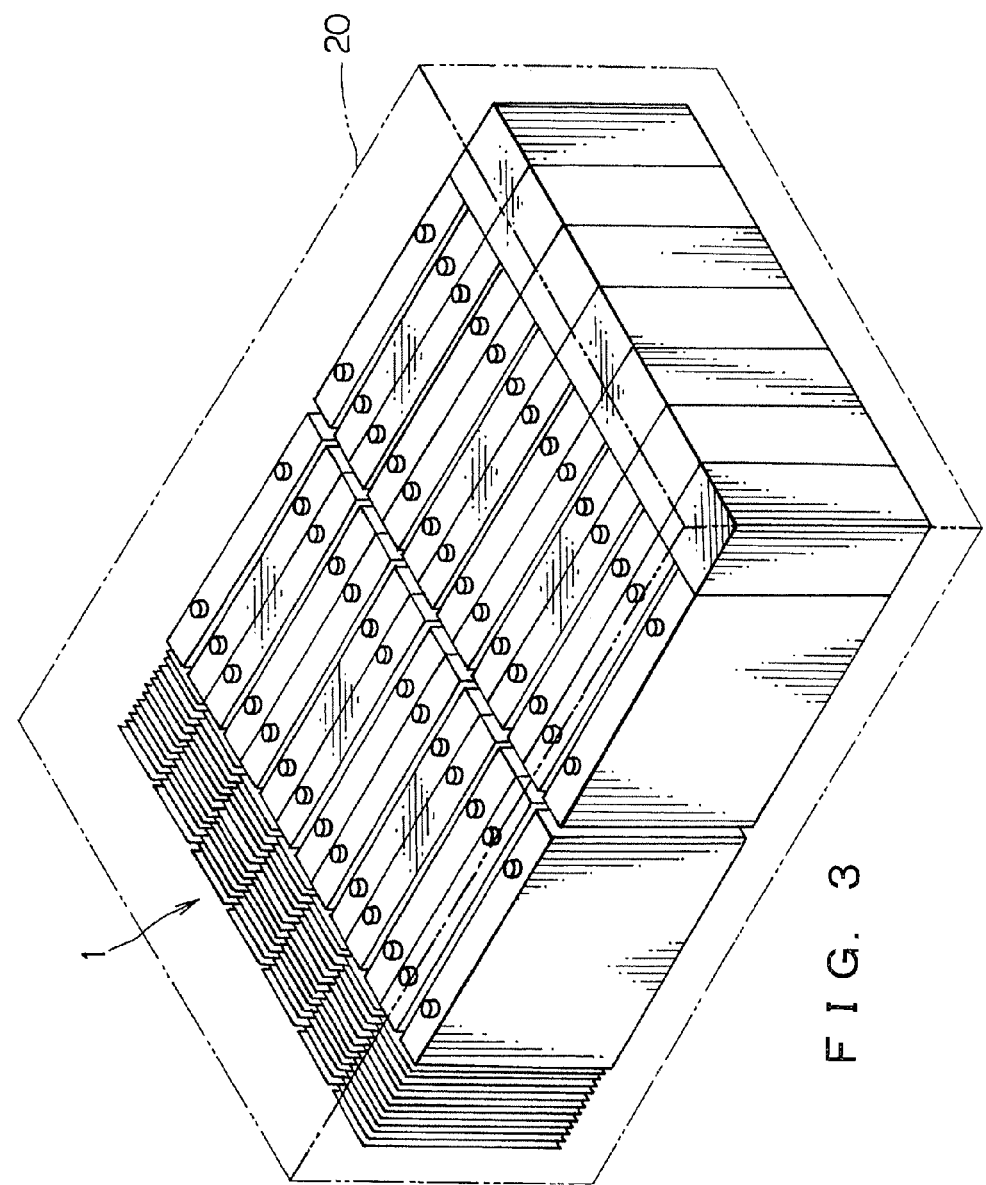
FIG. 3 is a schematic structural diagram showing a case where a battery in which the battery temperature regulation system of the first embodiment is incorporated is accommodated in a battery accommodating box.

FIG. 1 is a perspective view illustrating a battery temperature regulation system of a first embodiment of the invention. FIG. 2 is a cross-sectional view taken along A-A of FIG. 1. FIG. 3 is a schematic structural diagram showing a battery of FIG. 1 accommodated in a battery accommodating box.

A battery 1 includes fourteen battery elements 2A disposed in an aligned manner.

Each battery element 2A includes battery cells 2a disposed in an aligned manner. (For the sake of convenience, a battery cell on a heater 12 side is indicated with a numeral "2a1" and a battery cell 2a2 on a fin 13 side is indicated with a numeral "2a2".

The battery cells 2a1 and 2a2 are rectangular column-shaped battery of the same shape and the battery cells 2a1 and 2a2 are provided with a positive ("+") terminal 6a and a negative ("−") terminal 6b on their upper surfaces, respectively.

The battery temperature regulation system 10 is provided with a heat pipe 11, a heater 12 serving as a heating device, and a fin 13.

The heat pipe 11 is arranged horizontally in a space (gap portion 5) formed between neighboring battery cell elements 2A and is thermally connected to these neighboring battery cell elements 2A (in this embodiment, directly in contact with four battery cells 2a). The heat pipe 11 is disposed in such a manner that both ends thereof (end portions 11a and 11b) protrude in a horizontal direction from the gap portion 5 formed between the neighboring battery cell elements 2A. The aforementioned heat pipe 11 includes, for example, a sealed container made of a metal having a good thermal conductivity, such as copper and aluminum, or an alloy of the aforementioned metal, and a working fluid enclosed therein under a reduced pressure. The shape of the container may be, other than a substantially rectangular cross-section of the present embodiment, a shape having a flattened or circular cross-section or a plate-like shape. The heat pipe may include a wick formed on an inner surface of the container with a mesh or a coil of a metal wire or a porous metal or may be subject to a groove process on an inner surface of the container. A space that serves as a flow channel for the working fluid is provided inside the heat pipe 11. The working fluid contained in the space changes phase by evaporation (heat receiving portion) and condensation (heat dissipating portion) and moves internally to perform heat transportation.

The heaters 12 are thermally connected to the end portions 11a (heat receiving portions), respectively. The heater 12 heats the heat pipe 11 with an electric power supplied from a power supplying device, not shown. Further, according to the present embodiment, in order to transmit the heat from the heater 12 to the heat pipe 11 in an efficient manner, a heat insulating material 14 is provided around the heater 12. The heater 12 is not particularly limited, and may be formed by winding a heating wire on the lower end portion 11a. The heater 12 is preferably directly connected to the heat pipe 11, but may also be connected via a metal plate or the like in a case where the heat pipe 12 has a flattened shape.

The fin 13 is a member for efficiently dissipating heat emitted from the battery cell 2a and transported through the heat pipe 11 serving as a medium, and each fin 13 includes a plurality of plates that are thermally connected to the end portion 11b (heat dissipating portion). The fin 13 may be formed by securing an extruded heat sink by soldering or may be formed by applying a burring process to a central portion of a thin metal plate of aluminum or copper and press fitting the heat pipe 11 into the thin plate.

According to the present embodiment, it is configured in such a manner that the heater 12 is provided for each heat pipe 11 and that one each of the fin 13 and the heat insulating material 14 are provided for two heat pipes 11, but the configuration is not necessarily limited thereto. In other words, for example, a configuration in which a single heater 12 heats all heat pipes 11 at the same time or a configuration in which a single fin 13 is thermally connected to all heat pipes 11 may be employed as appropriate.

According to the battery temperature regulation system 10 of the present embodiment, since the heat pipe 11 which is a thermally conductive member that transports heat from the heating device (heater 12) is provided, the heat from the heating device (heater 12) can be efficiently transported to the battery 1 to heat the battery 1 efficiently. Particularly, since the heat pipe 11 is disposed in the space (gap portion 5) formed between the neighboring battery cell elements 2A, the battery 1 can be heated uniformly into an inner portion thereof.

Further, according to the battery temperature regulation system 10 of the present embodiment, since the heat pipe 11 is thermally connected to the heater 12 and the fin 13, the heating of the battery 1 can be performed more efficiently by further providing, in addition to the heater 12, a warm air supplying device such as an engine exhaust heat (exhaust gas) supplying device as the heating device, by delivering air (warm air) from the engine and/or the air conditioning apparatus (air heater) to the fin 13. The air conditioning apparatus may be an apparatus that also serves as a car cabin air conditioning apparatus as disclosed in Patent Document 1.

When the battery 1 is operating or the battery 1 is in an over-heated state of a predetermined temperature or above in a high-temperature condition, the heat from the battery 1 transported by the heat pipe 11 is efficiently dissipated through the fin 13 into the atmosphere. In such a case, by exposing the fin 13 to cold air from the air conditioning apparatus (cooling device), a cooling efficiency for the battery 1 can be improved. The air conditioning apparatus serving as the cooling device may be the same as the air conditioning apparatus serving as the heating device. Also, in this case too, the air conditioning apparatus may be an air conditioning apparatus that also serves as a car cabin air conditioning apparatus as disclosed in Patent Document 1.

As shown in FIG. 3, since the battery 1 is generally installed in a vehicle by being accommodated in a battery box 20 having substantially the same size as the battery 1, it is not necessarily required to secure the battery units to each other, to secure the heat pipe and the battery cell, and so on, but these may be secured with adhesive or the like, as necessary. Also, the battery cell may be provided with a groove for securing the heat pipe.

Embodiment 2

Figure 5:
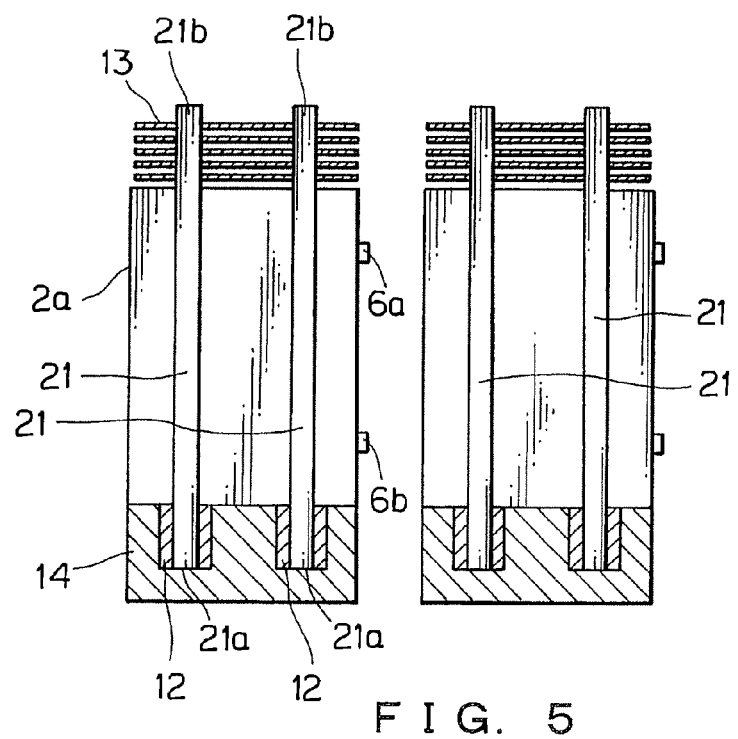
FIG. 5 is a cross-sectional view taken along B-B of FIG. 4.

FIG. 4 is a perspective view of a battery temperature regulation system 30 of a second embodiment of the invention. FIG. 5 is a cross-sectional view taken along B-B of FIG. 4. A part of the members in common with Embodiment 1 are indicated with common numerals.

According to the present embodiment, a battery 50 includes a total of twenty-eight (14×2) battery cells 2a (battery elements 2A).

The battery cells 2a are rectangular column-type batteries of the same shape and a positive ("+") terminal 6a and a negative ("−") terminal 6b are provided on a side surface of each battery cell 2a.

The battery temperature regulation system 30 includes a heat pipe 21, a heater 12 serving as a heating device and a fin 13.

The heat pipe 21 is arranged vertically in a gap portion 5 formed between the neighboring battery elements 2A (battery cells 2a) in a manner thermally connected with the two battery cells 2a (in this embodiment, directly in contact with the two battery cells 2a). Also, the heat pipe 21 is arranged in such a manner that a lower end portion 21a protrudes in a vertical direction from between the two battery cells 2a, i.e., from lower surfaces of the battery cells 2a. Further, the heat pipe 21 is arranged in such a manner that an upper end portion 21b protrudes in a vertical direction from between the two battery cells 2a, i.e., from upper surfaces of the battery cells 2a.

The heaters 12 are thermally connected to the lower end portions 21a (heat receiving portions), respectively. The heater 12 heats the heat pipe 21 with an electric power supplied from a power supplying device, not shown. Further, according to the present embodiment, a heat insulating material 14 is provided around the heater 12 to transfer heat from the heater 12 to the heat pipe 21 in an efficient manner.

The fin 13 is a member for efficiently dissipating heat emitted from the battery cell 2a and transported through the heat pipe 11 that is serving as a medium, each fin 13 including a plurality of plates thermally connected to the upper end portion 21b (heat dissipating portion).

The present embodiment is also configured in such a manner that the heater 12 is provided for each heater pipe 21 and that one each of the fin 13 and the heat insulating material 14 are provided for two heat pipes 21, but similarly to the first embodiment, the configuration is not necessarily limited thereto.

According to the battery temperature regulation system 30 of the present embodiment, by providing the heat pipe 21 which is a thermally conductive member for transporting heat from the heating device (heater 12), heat from the heating device (heater 12) can be efficiently transported to the battery 50 and the battery 50 can be efficiently heated. Particularly, since the heat pipe is disposed in a space (gap portion 5) formed between the neighboring battery cells 2a, the battery 50 can be heated uniformly into an inner portion thereof. Similarly to Embodiment 1, in addition to the heater 12, a warm air supplying device such as an engine exhaust heat (exhaust gas) supply device may be provided as the heating device.

Further, according to the present embodiment, the heater 12 is thermally connected to the lower end portion 21a of the heat pipe 21, and the fin 13 is thermally connected to the upper end portion 21b of the heat pipe 21. In general, it is known that a thermal transportation efficiency of the heat pipe decreases in a top heat mode (a manner of installation in which the working fluid evaporation portion is placed at the top). With the configuration of the present embodiment, when the temperature of the battery cell has become higher than the temperature of the heater 12 during a heating process with a heater 12, since it becomes the top heat mode, if heating by the heater 12 is continued, a maximum heat transport amount will be exceeded and reach a situation where heat transportation cannot be carried out. In such a situation, the temperature of the heater 12 will increase rapidly. Therefore, by further providing a monitoring device that monitors the temperature of the heater 12 and an operation/halt controlling device that performs operation/halt control of the heater 12 based on results from the monitoring device (whether there is a rapid temperature increase or not, etc.,) as the constituent elements of the battery temperature regulation system 30, temperature regulation of the battery can be performed more efficiently.

When the battery 50 is operating or the battery 50 is, under a high-temperature condition or the like, in an overheated state of a predetermined temperature or above, the heat of the battery 50 transported by the heat pipe 21 is efficiently dissipated from the fin 13 into the atmosphere. In such a case, the fin 13 is exposed to air (preferably cold air) from the air conditioning apparatus (cooling device) and a cooling efficiency of the battery 1 can be improved. Also, in this case too, the air conditioning apparatus may be an air conditioning apparatus that also serves as a car cabin air conditioning apparatus as disclosed in Patent Document 1.

Embodiment 3

Figure 6:
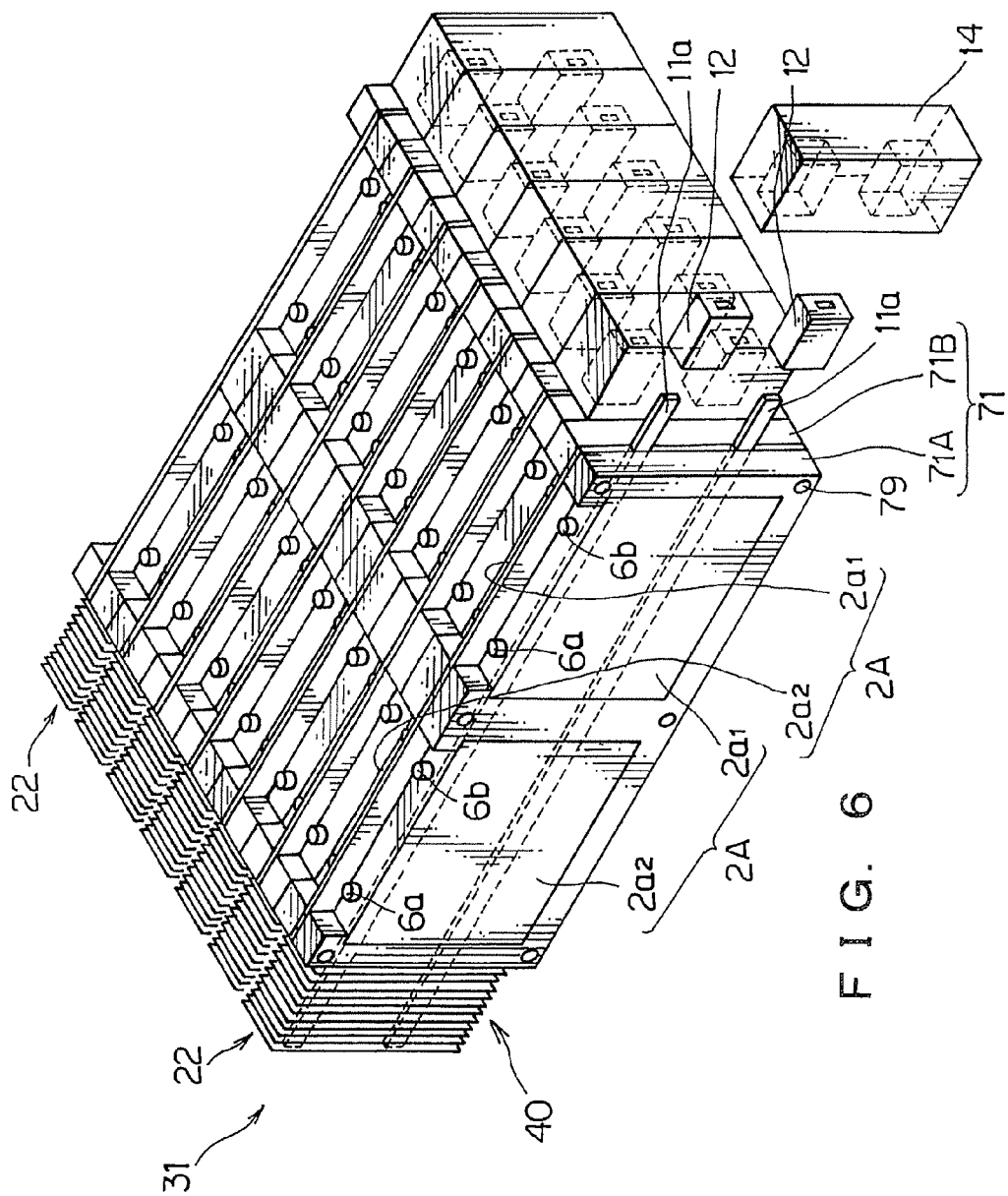
FIG. 6 is a perspective view illustrating a battery temperature regulation system of a third embodiment.

FIG. 6 is a perspective view of a battery temperature regulation system 40 of a third embodiment of the invention. A part of the members in common with Embodiment 1 are indicated with common numerals.

In FIG. 6, the configuration of the battery 31 is similar to the configuration of the battery 1 of Embodiment 1.

The battery temperature regulation system 40 of FIG. 6 includes a battery temperature regulation unit 22 of the invention.

Figure 7A:
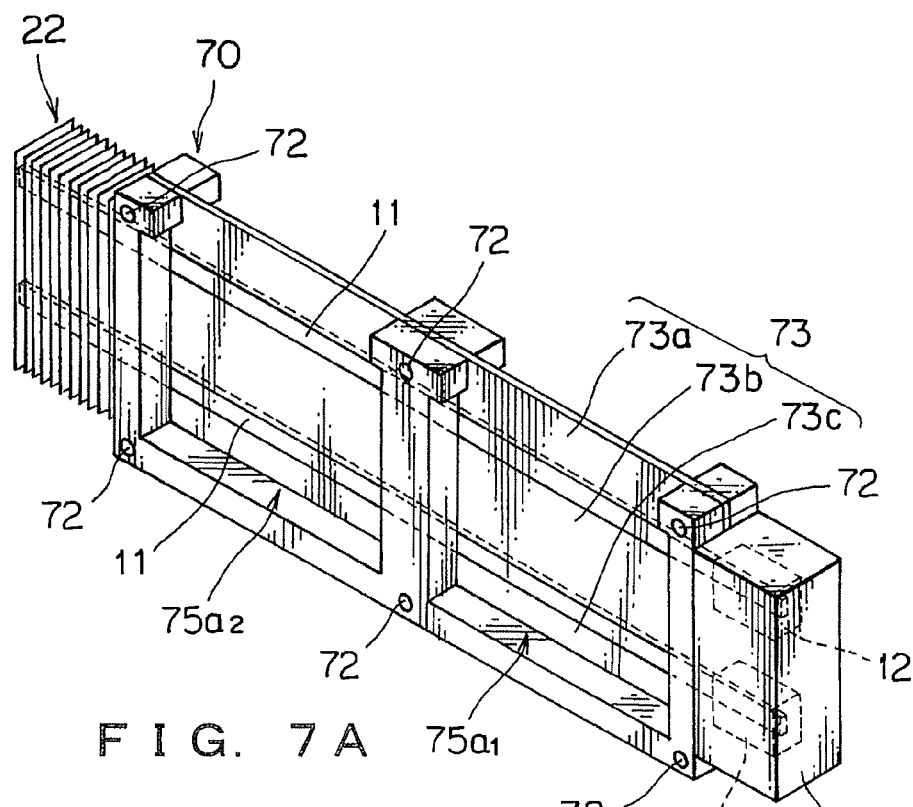
FIGS. 7A and 7B are perspective views illustrating a battery temperature regulation unit and a securing device provided in the battery temperature regulation system of the third embodiment, respectively.
Figure 7B:
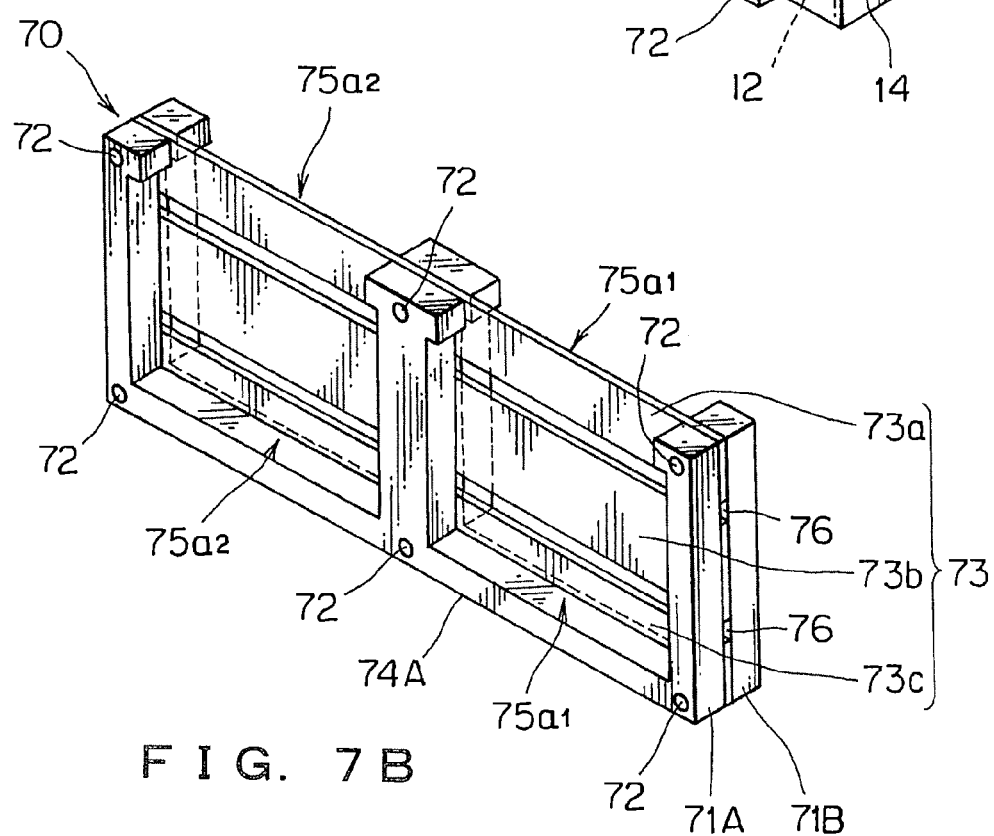

FIG. 7A is a perspective view of a battery temperature regulation unit 22 of the invention and FIG. 7B is a perspective view of a securing device 70 provided in the battery temperature regulation unit 22.

As shown in FIG. 7A, the battery temperature regulation unit 22 includes a securing device 70, a heat pipe 11, a heater 12 serving as a heating device, and a fin 13.

The securing device 70 includes an accommodating member 71A and an accommodating member 71B that are formed integrally.

The accommodating member 71A includes an interposed portion 73 that is interposed between the neighboring battery elements 2A as well as a frame portion 74A.

According to the present embodiment, the interposed portion 73 includes interposed portions 73a, 73b, and 73c, each having a plate-like shape. A heat pipe securing portion 76 capable of holding the heat pipe 11 in an inserted (fitted) state is formed between the interposed portion 73a and 73b. Similarly, a heat pipe securing portion 76 capable of holding the heat pipe 11 in an inserted (fitted) state is formed between the interposed portion 73b and 73c.

The frame portion 74A is provided so as to surround the periphery of the battery cells 2a1 and 2a1. The frame 74A and the interposed portion 73 form battery cell accommodating (securing) portions 75a1 and 75a1 in which the battery cells 2a1 and 2a1 fit in, respectively. 75a1 and 75a2 constitute the battery element securing portion 75.

The accommodating member 71B includes a frame portion 74B. The frame portion 74B surrounds the periphery of the battery cells 2a1 and 2a2. The frame 74B and the interposed portion 73 of the accommodating member 71A form battery cell accommodating (securing) portions 75a1 and 75a2 in which the battery cells 2a1 and 2a2 fit in, respectively. 75a1 and 75a2 constitute the battery element securing portion 75. In this example, a pair of battery element securing portions 75 are provided to sandwich the heat pipe securing portion 76, but the battery element securing portion 75 may be provided only on one side of the heat pipe securing portion 76 (interposed portion 73).

The heat pipe 11 is arranged horizontally between the neighboring battery cell elements 2A in a state where it is thermally connected to these battery cell elements 2A as well as the accommodating members 71A and 71B (in this embodiment, in a state where it is directly in contact with to four battery cells 2a as well as the accommodating members 71A and 71B) by being inserted in the heat pipe accommodating portion 76. The heat pipe 11 is disposed in such a manner that either end thereof (end portions 11a and 11b) protrudes horizontally from between the neighboring battery cell elements 2A. In this example, the heat pipe 11 is not fixed to the accommodating members 71A and/or 71B, but these may be fixed by measures such as soldering.

Similarly to Embodiment 1, the heater 12 and the fin 13 are thermally connected to the end portions 11a (heat receiving portion) and 11b, respectively.

The battery temperature regulation system 40 is formed by securing seven battery temperature regulation units 22 by inserting a securing pin 79 in a state where the securing pin insertion holes 72 provided in each securing device 70 communicate with each other. The securing pin 79 may be fixed to the securing pin inserting hole 72 as appropriate by using an adhesive or the like. Other securing members such as screws may also be used to secure the battery temperature regulation units 22 to each other.

Effects similar to those of the battery temperature regulation system 10 of the first embodiment can be achieved. Further, according to the battery temperature regulation unit 22 of the invention, an efficiency of an assembling operation can be increased significantly, since the battery cells 2a constituting the neighboring battery cell elements 2A and the heat pipe 11 (and also the heater 12, the fin 13 and the heat insulating material 14) can be integrally secured in advance by the securing device 70. Also, with the interposed portions 73a-73c being thermally in contact with a side surface of the heat pipe 11, a heat transfer loss at the side surface of these heat pipes 11 can be reduced.

Embodiment 4

Figure 8:
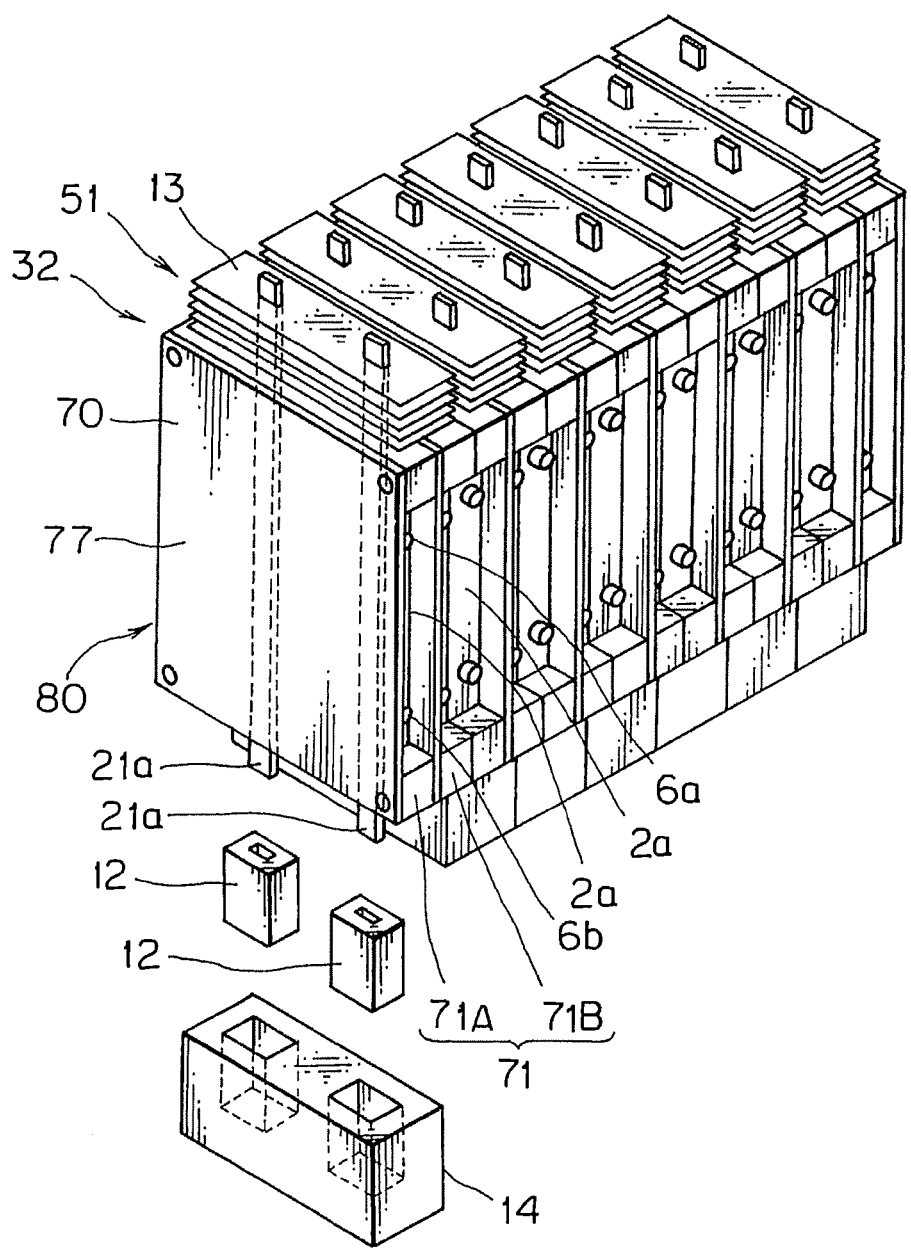
FIG. 8 is a perspective view illustrating a battery temperature regulation system of a fourth embodiment.

FIG. 8 is a perspective view of a battery temperature regulation system of a fourth embodiment of the invention. A part of the members in common with Embodiments 1 to 3 are indicated with common numerals.

In FIG. 8, the configuration of a battery 51 is similar to the battery 50 in Embodiment 2. A battery temperature regulation system 80 of FIG. 8 is provided with a battery temperature regulation unit 32.

Figure 9A:
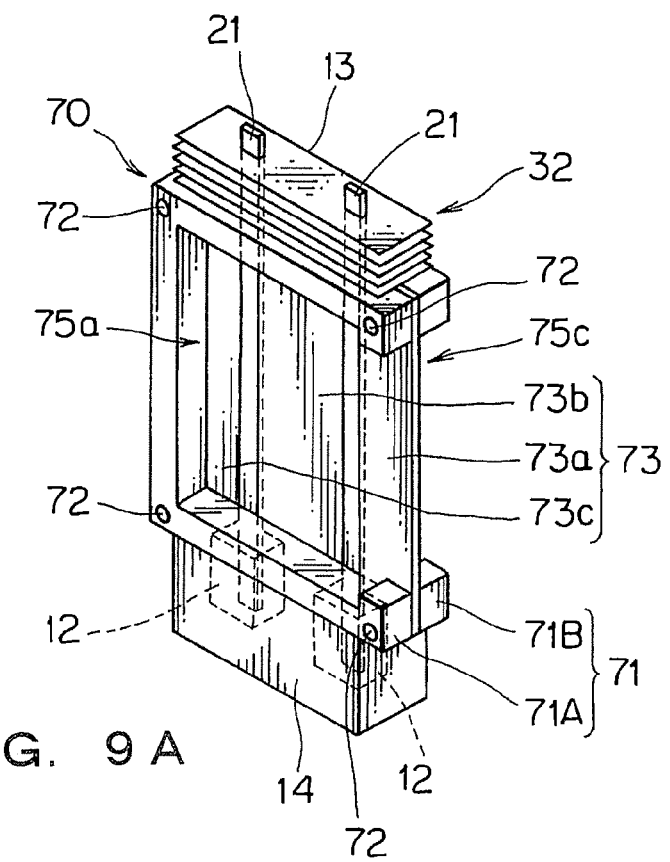
FIGS. 9A and 9B are perspective views illustrating a battery temperature regulation unit and a securing device provided in the battery temperature regulation system of the fourth embodiment, respectively.
Figure 9B:
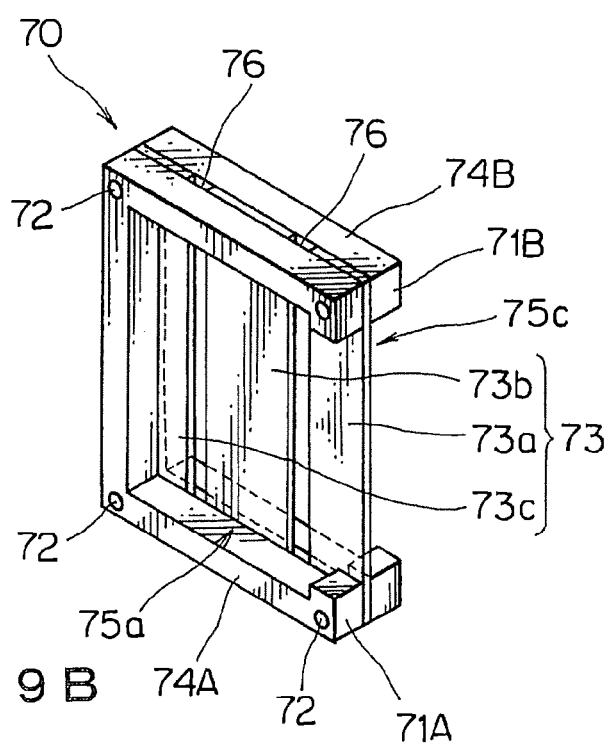

FIG. 9A is a perspective view of the battery temperature regulation unit 32 of the invention and FIG. 9B is a perspective view of a securing device 70 provided in the battery temperature regulation system 32.

The battery temperature regulation unit 32 includes the securing device 70, a heat pipe 11, a heater 12 serving as a heating device and a fin 13.

The securing device 70 includes an accommodating member 71A and an accommodating member 71B that are formed integrally.

The accommodating member 71A includes an interposed portion 73 that is interposed between the neighboring battery elements 2A (battery cells 2a), the frame portion 74 and a blocking plate 77 that blocks the frame portion 74A (note that, in FIGS. 9A and 9B, the blocking plate 77 is omitted for the sake of explanation.)

The interposed portion 73 is interposed between the neighboring battery elements 2A (battery cells 2a). According to the present embodiment, the interposed portion 73 includes interposed portions 73a, 73b, and 73c, each having a plate-like shape. A heat pipe securing portion 76 capable of holding the heat pipe 11 in an inserted (fitted) state is formed between the interposed portion 73a and 73b as well as between the interposed portion 73b and 73c, respectively.

The frame portion 74A is provided so as to surround the periphery of the battery cell 2a. A space surrounded by the frame 74A, the interposed portion 73 and the blocking plate 77 is a battery cell securing (battery element securing) portion 75a in which the battery cell 2a fits.

The accommodating member 71B includes a frame portion 74B. The frame portion 74B is provided so as to surround the periphery of the battery cell 2a. The frame portion 74B and the interposed portion 73 of the accommodating member 71A form a battery cell accommodating (securing) portion 75a in which the battery cell 2a fits.

The heat pipe 21 is arranged vertically between the neighboring battery cell elements 2A by being inserted in the heat pipe securing portion 76 and is thermally connected to the battery cells 2a constituting these battery elements 2A and the accommodating members 71A and 71B (directly in contact with the two battery cells 2a, as well as the accommodating members 71A and 71B). The heat pipe 21 is disposed in such a manner that both ends thereof (end portions 21a and 21b) protrude vertically from between the neighboring battery elements 2A. In this example, the heat pipe 21 is not fixed to the accommodating members 71A and/or 71B, but these may be fixed by measures such as soldering.

Similarly to Embodiment 2, the heater 12 and the fin 13 are thermally connected to the end portions 11a and 11b, respectively.

The battery temperature regulation system 80 is formed by securing seven battery temperature regulation units 22 by inserting a securing pin 79 in a state where the securing pin insertion holes 72 provided in each securing device 70 communicate with each other. The securing pin 79 may be fixed to the securing pin inserting hole 72 as appropriate by using an adhesive or the like. Other securing members such as screws may also be used to secure the battery temperature regulation units 22 to each other.

An operation of the battery temperature regulation system 80 has similar effects as those of the battery temperature regulation system 30 of the second embodiment. Further, according to the battery temperature regulation unit 32 of the invention, an efficiency of an assembling operation can be increased significantly, since the battery cells 2a constituting the neighboring battery cell elements 2A and the heat pipe 11 (and also the heater 12, the fin 13 and the heat insulating material 14) can be integrally secured in advance by means of the securing device 70. Also, with the interposed portions 73a-73c being thermally connected to the side surface of the heat pipe 11, a heat transfer loss at the side surface of these heat pipes 11 can be reduced.

Embodiment 5

Figure 10:
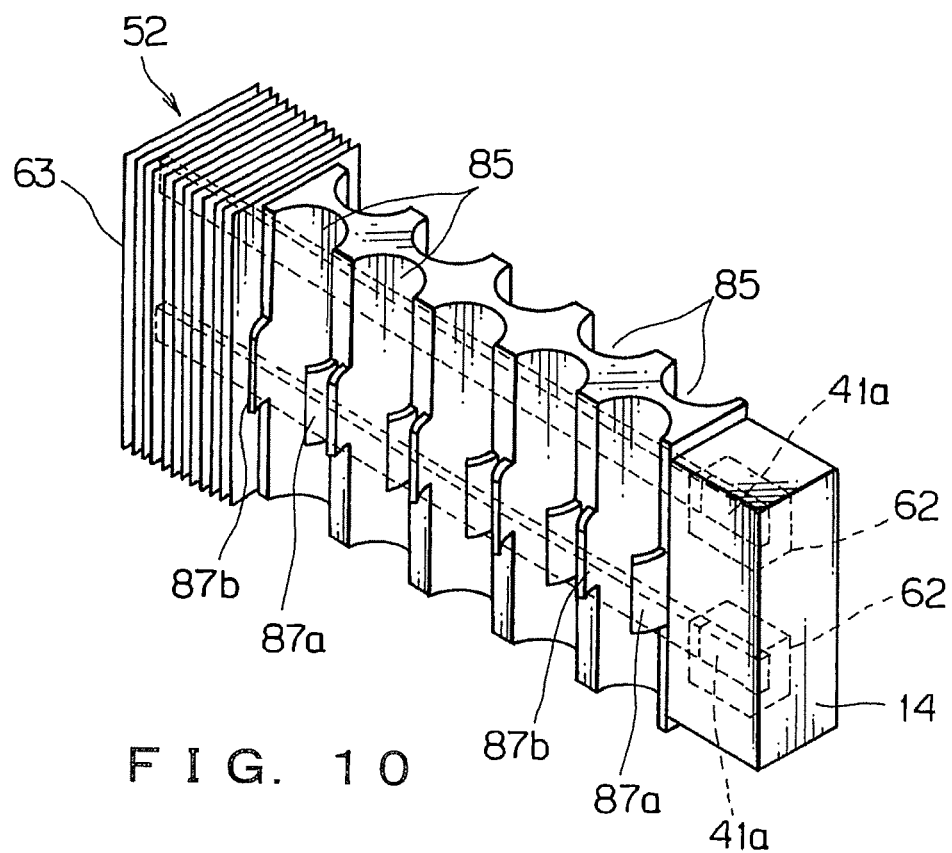
FIG. 10 is a perspective view illustrating an exemplary configuration of the battery temperature regulation unit for a case where a cylindrical battery cell is used as a battery cell.
Figures 11A, 11B:
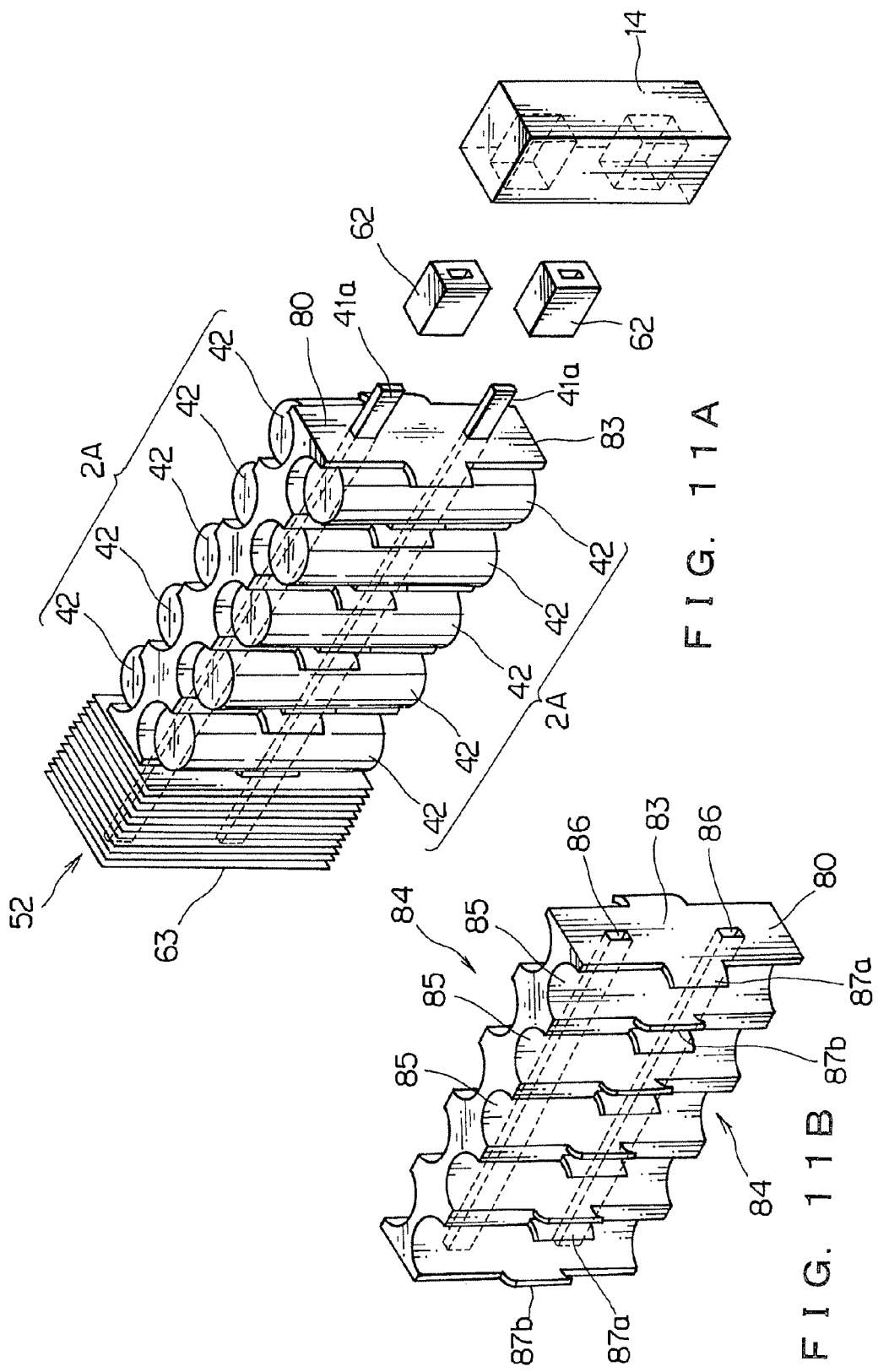
FIGS. 11A and 11B are perspective views illustrating a state where a battery is secured to the battery temperature regulation unit of FIG. 10 and the securing device of the battery temperature regulation unit of FIG. 10, respectively.

FIG. 10 is a perspective view illustrating a battery temperature regulation unit 52 for a case where a cylindrical battery cell is used as a battery cell. FIG. 11A is a perspective view illustrating a state where a battery is secured to the battery temperature regulation unit 52 and FIG. 11B is a perspective view illustrating the securing device 80 of the battery temperature regulation unit 52.

The battery temperature regulation unit 52 includes the securing device 80, a heat pipe 41, a heater 62 and a fin 63.

The securing device 80 includes an interposed portion 83 that is interposed between neighboring battery elements 2A and a pair of battery element securing portions 84 disposed opposite to each other across the interposed portion 83 and formed integrally with the interposed portion 83 to secure the battery cells 42 constituting the battery elements 2A.

The interposed portion 83 is provided with a heat pipe securing portion 86 formed therein through which the heat pipe 41 is inserted and held.

Each cylindrical battery cell 42 is secured to the interposed portion 83 by being fitted in a recess 85 provided in the interposed portion 83, the recess 85 having a semicircular arc-shape to match the shape of a peripheral surface of a cylindrical battery cell 42, and by being retained with retaining tabs 87a and 87b of the interposed portion 83. The retaining tabs 87a and 87b are elastic members that are more open in a state where the battery cell 42 is fitted in the recess 85 than in a non-fitted state (elastic deformation) and are configured in such a manner that the battery 42 remains fitted in the recess 85 with an elastic restoring force produced in such a state pressing the battery cell 42. The battery cell 42 may be secured by pressing the battery cell 42 with a separate member having a recess similar to the recess 85 and then securing the separate member to the interposed portion 83 by screwing or the like.

The heat pipe 41 is arranged horizontally between the neighboring battery cell elements 2A by being inserted in the heat pipe securing portion 86 and is thermally connected to all battery cells 42 constituting these neighboring battery cell elements 2A as well as the securing device 80 (in this embodiment, directly in contact with the securing device 80). The heat pipe 41 is disposed in such a manner that both ends thereof protrude horizontally from between the battery cell elements 2A. In this example, the heat pipe 41 is not fixed to the securing device 80, but these may be fixed by measures such as soldering. Further, the securing device 80 may be configured such that only a portion in contact with the battery cell and the heat pipe is made of metal and the securing portion 40 is made of resin.

Embodiments 6 and 7

Figure 12:
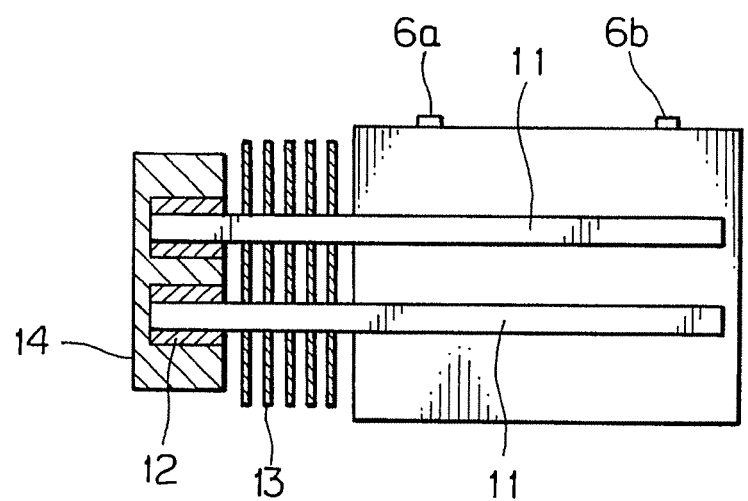
FIG. 12 is a cross-sectional view showing a modified example of a manner of arrangement of the heat pipes, etc.
Figure 13:
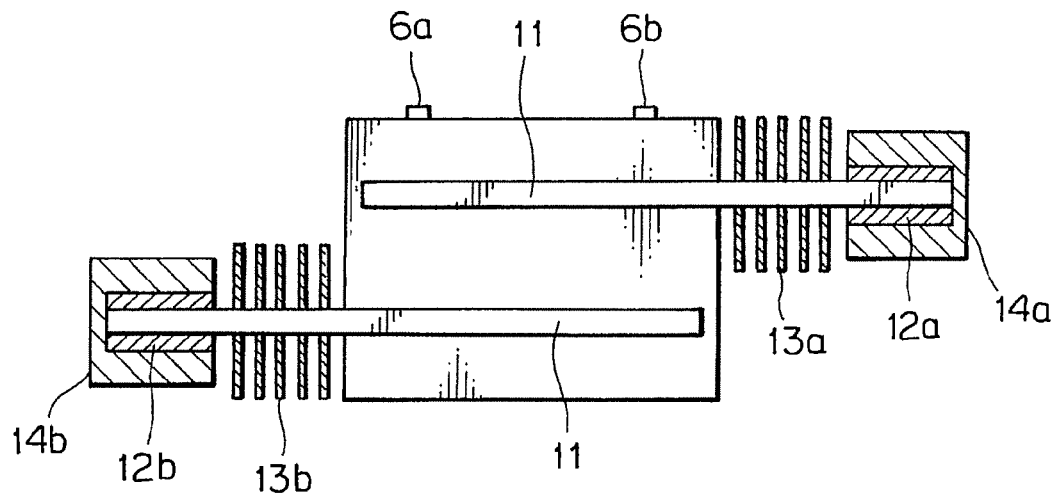
FIG. 13 is a cross-sectional view showing a modified example of a manner of arrangement of the heat pipes, etc.

According to the aforementioned embodiments, a fin and a heater are connected to respective ends of a heat pipe serving as a heat conducting member, but the arrangement of the fin and the heater are not limited to the modes illustrated in the aforementioned embodiments. Other modes will be described with reference to FIGS. 12 and 13.

In Embodiment 6 (FIG. 12), the heat pipe 11 is arranged between the neighboring battery elements such that at least a portion thereof protrudes from between the neighboring battery elements, and the fin 13 and the heater 12, which is serving as a heating device, are both thermally connected to the protruding portion.

Further, in Embodiment 7 (FIG. 13), similarly to Embodiment 6, the heat pipe 11 is arranged between the neighboring battery elements such that at least a portion of the heat pipe 11 protrudes from between the neighboring battery elements, and the fin 13 and the heater 12 which is serving as a heating device are both thermally connected to the protruding portion. The fin 13 thermally connected to the heat pipe 11 is arranged on either side in the horizontal direction of the battery cell 2. Also, in this example, the heater 12 which is thermally connected to the heat pipe 11 is also arranged on either side in the horizontal direction of the battery cell 2. According to the present embodiment, for example, even in a case where the vehicle or the like is inclined, it is ensured that one of the two heat pipes 11 will come to a bottom heat mode (a state where a heat source is located at a lower side). Accordingly, even in a case where the vehicle is inclined, the battery heating efficiency can be prevented from decreasing.

The aforementioned Embodiments 1 to 7 have been described for a case where the heat pipe is used as a thermally conductive member, but the thermally conductive member of the invention is not particularly limited, it is possible to use other commonly known thermally conductive members, for example, metal such as copper and aluminum, graphite or the like. However, in order to fully achieve an effect which is an object of the invention, it is preferable to use a high heat conductive member of greater than or equal to 200 W/(m·K).

Figure 14:
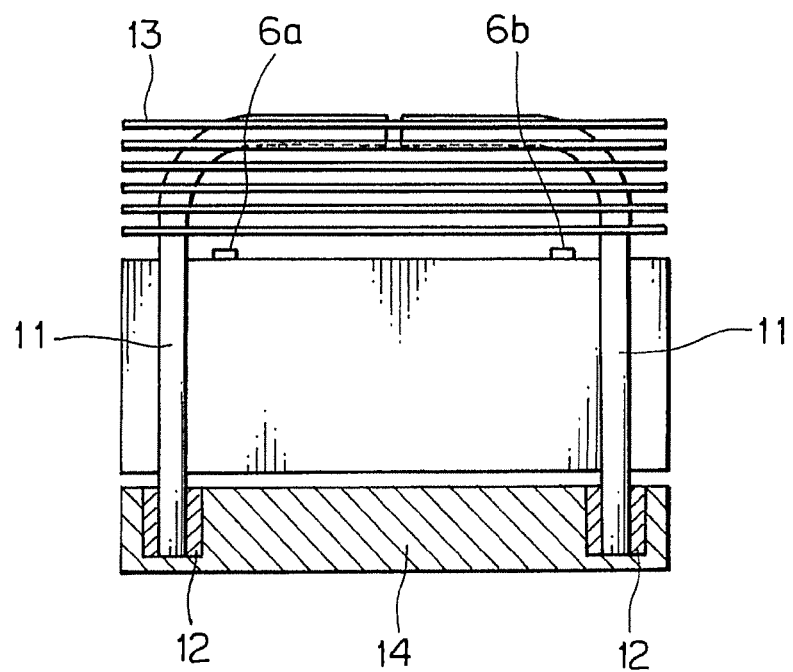
FIG. 14 is a cross-sectional view showing a modified example of a shape of the heat pipe.

Further, according to the aforementioned embodiments, a straight rod-shaped heat pipe is used as the heat conducting member, but the shape of the heat conducting member is not limited thereto. For example, the heat conducting member (heat pipe) may be shaped in a substantially C-shaped manner (FIG. 14) or substantially annular (FIG. 15). The positions where the fin and the heater are installed are not limited to the example in the aforementioned embodiments, but the fin may be provided at an intermediate portion of the heat pipe (FIG. 14). Further, the then and the heater may be provided at an intermediate portion of the heat pipe (FIG. 15). Further, the fin and the heater need not necessarily be thermally connected to the same heat pipe and the heater may be connected to a heat pipe which is different from a heat pipe where the fin is connected to.

In a case where it is assumed that heating is performed by the heater only, a heat dissipation suppressing mechanism may be provided that suppresses heat dissipation from the fin. The heat dissipation suppressing mechanism may be, for example, a blocking mechanism that inhibits natural convection by blocking a space surrounding the fin, particularly, an upper space.

In a case where a heat pipe is used as the thermally conductive member, the working fluid may be water, hydrochlorofluorocarbon such as HCFC-22, hydrofluorocarbon such as HFCR 134a, HFCR 407C, HFCR 410A and HFC 32, hydrofluoroolefin such as HFO1234yf, carbon dioxide, ammonia, and propane, but not limited thereto. Among these, considering the performance and the effect on the global environment, water, carbon dioxide and hydrofluoroolefin are preferable.

Also, in the aforementioned embodiments, those embodiments in which a heater as well as a warm air supplying device such as an air conditioning apparatus and an engine heat exhaustion (air exhaustion) supply device are used as the heating device have been described, but the invention is not limited to such embodiments, and one or more heating device commonly known can be used. A heating device that can be directly connected to a heat pipe may be a thermoelectric elements or an electromagnetic induction heating device. In a case where warm water is used as a heating medium of a heat pipe, a warm water supplying device can be used as a heating device of a battery temperature regulation system of the invention. Also, a cooling device in a case where the heat pipe is cooled is not particularly limited and may be an air conditioning apparatus and a thermoelectric element. Further, in a case where cooling water is used as a medium for cooling the heat pipe, the cooling water supplying device may be the cooling device of a battery temperature regulation system of the invention. In a case of a hybrid vehicle, since an engine and a motor are used in combination, exhaust heat from the engine can be utilized as a heat source of the warm water supplying device (see FIG. 16). In the battery temperature regulation system shown in FIG. 16, the warm water supplying device (heating device) includes a heat exchanging device that exchanges heat between engine cooling water that has been heated by passing through the engine and battery heating water for heating the battery, and a circulating device for circulating the aforementioned battery warm water between the heat exchanging device.

FIG. 16 shows a circulating system of the battery warm water during the heating of the battery, however, during the cooling of the battery, it becomes a structure provided with a heat exchanging device that exchanges heat with the cooling water that has just flowed out from a radiator. The battery temperature regulation system may be configured to include both the heating system and the cooling system and to switch between the systems to be operated depending on a battery condition.

It goes without saying that the manner in which the aforementioned battery cells are electrically connected to each other may be a serial connection, a parallel connection or a combination of both.

EXAMPLE

Hereinafter, the invention will be further described in detail in accordance with the present example.

In present example, an effect of the invention was analyzed by a simulation. In other words, it was assumed that twenty-eight battery cells (7 battery cells×4 rows) of 110 mm×20 mm×80 mm were arranged. An amount of heat generated by each cell was assumed to be 10 W and a temperature change of the battery cell during the starting up of the battery system at −40° C. was simulated under respective conditions described below.

Condition 1: Warm air (40° C.) from an air conditioner was directly blown on the battery cells without any heat pipes.

Condition 2: With an arrangement similar to Embodiment 1, two heat pipes each were arranged between the battery cells, giving a total of fourteen heat pipes. However, each heat pipe was not connected to a heater, and a fin was provided at each end thereof. Under such a condition, warm air (40° C.) was blown on the fin.

Condition 3: With an arrangement similar to Embodiment 1, two heat pipes each were arranged between the battery cells, giving a total of fourteen heat pipes. However, each heat pipe was not connected to a fin, and a heater was provided on each end thereof and heated with the heater only.

Condition 4: With an arrangement similar to Embodiment 1, two heat pipes each were arranged between the battery cells, giving a total of fourteen heat pipes, and heated with warm air (Condition 4-1: 30° C., Condition 4-2: 0° C.) to the fin used in combination with the heater.

The results are shown in Table 1. In Table 1, "AMOUNT OF HEAT FOR WARM AIR" represents an amount of heat required to increase the temperature of the air conditioner from −40° C. to a predetermined temperature, "AMOUNT OF HEAT OF HEATER" represent an amount of heat inputted into the heater, and "TOTAL AMOUNT OF HEAT" represents a sum of the amount of heat of warm air and the amount of heat of the heater. "HEATING UP TIME" represents time required for temperatures of all the battery cells to reach 0° C. from the start up of the system.

In a case of Condition 1, the amount of power consumed to cause the battery cells to reach 0° C. was 1439 Wh. From this result and the result for Condition 2 in which air from the air conditioner was similarly used, it can be seen that the heating up time was shortened and the power consumption was also decreased by using heat pipes.

Also, in the case of Condition 3, it was possible to decrease the power consumption to approximately 1/10 of the power consumption for the case of Condition 1, but the heating up time was 920 seconds. On the other hand, in the case of Condition 4-1, it was possible to shorten the heating up time to approximately half the heating up time for the case of Condition 1. Further, in the case of Condition 4-2, although the heating up time was 730 seconds, it was possible to make the power consumption to 628 Wh, which is approximately 44% of the power consumption for the case of Condition 1.

From the aforementioned results, it can be seen that, by arranging a heat pipe in a battery temperature regulation apparatus and using a fan and a heater in combination, the heating of the battery can be achieved with the heating-up time characteristic and the power consumption characteristic being balanced.

Further, FIG. 17 shows measurement data of a temperature variation between the cells in the aforementioned simulation. The temperature variation is a value obtained by subtracting the lowest temperature from the highest temperature of the cells within the battery back. As a result, in the case of Condition 1, a temperature difference between the cells becomes nearly 20° C., whereas, in the case of conditions 2-1 and 2-2, it can be suppressed to about 1° C.

LIST OF REFERENCE SIGNS 10, 50, 31, 51 battery,
22, 32, 52 battery temperature regulation unit,
2A battery element,
2a (2a1, 2a2) battery cell,
10, 30, 40, 80 battery temperature regulation system,
11, 21, 41 heat pipe,
12, 62 heater,
13, 63 fin,
14 heat insulating material,
20 battery box,
42 cylindrical battery cell,
70, 80 securing device,
71A, 71B accommodating member,
72 securing pin insertion hole,
73 interposed portion,
74A, 74B frame portion,
75a battery cell securing portion,
76 heat pipe securing portion

The invention claimed is:

1. A battery temperature regulation system for regulating a temperature of a battery, comprising:
 a thermally conductive member enclosing a working fluid and thermally connected to the battery, wherein the thermally conductive member is a sealed container; and

TABLE 1

|  | Warm Air Temperature (° C.) | Heat Pipe | Amount of Heat for Warm Air (W) | Amount of Heat of Heater (W) | Total Amount of Heat (W) | Heating Up Time (s) | Power Consumption (Wh) |
|---|---|---|---|---|---|---|---|
| Condition 1 | 40 | Without HP | 5080 | 0 | 5080 | 1020 | 1439 |
| Condition 2 | 40 | With HP | 5080 | 0 | 5080 | 780 | 1101 |
| Condition 3 | — | With HP | 0 | 560 | 560 | 920 | 143 |
| Condition 4-1 | 30 | With HP | 4443 | 560 | 5003 | 520 | 723 |
| Condition 4-2 | 0 | With HP | 2539 | 560 | 3099 | 730 | 628 | a heating device that heats the battery via the working fluid and/or a cooling device that cools the battery via the working fluid.

2. The battery temperature regulation system according to claim 1, wherein the battery is provided with a plurality of battery elements, each of the plurality of battery elements including a single battery cell or a plurality of battery cells arranged in an aligned manner, the thermally conductive member being disposed between the neighboring battery elements, the battery temperature regulation system comprising:
a fin that is thermally connected to the thermally conductive member; and
a warm air supplying device that delivers warm air to the fin, the warm air supplying device serving as the heating device.

3. The battery temperature regulation system according to claim 2, further comprising, as the heating device, a heating device that is different from the warm air supplying device.

4. The battery temperature regulation system according to claim 3, further comprising a thermal diffusion suppressing device that suppresses heat release from the fin while being heated by the heating device that is different from the warm air supplying device.

5. The battery temperature regulation system according to claim 1, wherein the battery is provided with a plurality of battery elements, each of the plurality of battery elements including a single battery cell or a plurality of battery cells arranged in an aligned manner, the thermally conductive member being disposed between the neighboring battery elements with both end portions being protruded from between the battery elements, a fin being thermally connected to one end portion of the thermally conductive member, the heating device being a warm air supplying device that deliver warm air to the fin and a heater that is thermally connected to the other end portion of the thermally conductive member.

6. The battery temperature regulation system according to claim 1, wherein the thermally conductive member is a heat pipe.

7. The battery temperature regulation system according to claim 1, wherein the thermally conductive member is a metal and/or graphite.

8. The battery temperature regulation system according to claim 1, wherein the heating device is at least one selected from an air conditioning apparatus, a thermoelectric element and a heater, and the cooling device is at least one selected from an air conditioning apparatus, a thermoelectric element and a cooling air supply device.

9. A battery temperature regulation unit used in temperature regulation of a battery provided with a plurality of battery elements, each of the plurality of battery elements including a single battery cell or a plurality of battery cells arranged in an aligned manner, the battery temperature regulation unit comprising:

a heat pipe securing portion whereto a heat pipe enclosing a working fluid is secured with at least one portion being protruded, wherein the heat pipe is a sealed container;

a battery element securing portion provided at least on one side of the heat pipe securing portion and securing a battery cell that constitutes one of the neighboring battery elements; and each of the plurality of battery elements being thermally connectable to the battery cell via the working fluid when the battery cell is secured to the battery element securing portion.

10. The battery temperature regulation unit according to claim 9, comprising a pair of battery element securing portions, the battery securing portions being provided on both sides of the heat pipe securing portion to sandwich the heat pipe securing portion, each of the battery element securing portions securing a battery cell that constitutes one of the neighboring battery elements.

11. The battery temperature regulation unit according to claim 9, wherein the heat pipe is secured to the heat pipe securing portion with at least two portions thereof being protruded, a fin being thermally connected to one portion of the heat pipe,
a heater being thermally connected to another portion of the heat pipe.

12. The battery temperature regulation unit according to claim 9, wherein the battery cell is one of a rectangular column-shaped battery cell, a laminated battery cell and a cylindrical battery cell.

13. A battery temperature regulation system for regulating a temperature of a battery, comprising:
a heat pipe enclosing a working fluid and thermally connected to the battery, wherein the heat pipe is a sealed container; and
a heating device that heats the battery via the working fluid and/or a cooling device that cools the battery via the working fluid.

14. The battery temperature regulation system according to claim 13, wherein the battery comprises a plurality of battery cells arranged in an aligned manner, and wherein the heat pipe is disposed between at least two neighboring battery cells among the plurality of battery cells.

15. The battery temperature regulation system according to claim 13, wherein the working fluid is adapted to change phase within the heat pipe to perform heat transportation.

16. The battery temperature regulation system according to claim 13, wherein the heat pipe comprises a heat receiving portion adapted to thermally connect with the heating device and a heat dissipation portion adapted to thermally connect with the cooling device.

17. The battery temperature regulation system according to claim 16, wherein the heat receiving portion and the heat dissipation portion protrude from the battery on opposing sides of the battery.

18. The battery temperature regulation system according to claim 16, wherein the heat receiving portion and the heat dissipation portion protrude from the battery on a common side of the battery.

19. The battery temperature regulation system according to claim 1, wherein the thermally conductive member is enclosing the working fluid at a reduced pressure.

* * * * *